United States Patent
Lim et al.

(10) Patent No.: US 7,042,120 B2
(45) Date of Patent: May 9, 2006

(54) BLDC MOTOR FOR WASHING MACHINE

(75) Inventors: Kyoung Suk Lim, Changwon-si (KR); Young Bok Son, Changwon-si (KR); Jeong Hun Kim, Changwon-si (KR); Sung Man Hwang, Changwon-si (KR); Kwang Won Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 10/484,508

(22) PCT Filed: Nov. 20, 2003

(86) PCT No.: PCT/KR03/02506

§ 371 (c)(1),
(2), (4) Date: Jan. 22, 2004

(87) PCT Pub. No.: WO2004/047283

PCT Pub. Date: Jun. 3, 2004

(65) Prior Publication Data

US 2005/0162024 A1    Jul. 28, 2005

(30) Foreign Application Priority Data

Nov. 20, 2002    (KR) ........................... 2002-0072440

(51) Int. Cl.
*H02K 5/24*    (2006.01)
*H02K 1/18*    (2006.01)

(52) U.S. Cl. .................................. 310/51; 310/259
(58) Field of Classification Search .................. 310/42, 310/51, 214, 217, 254, 259; 336/210
See application file for complete search history.

(56) References Cited

U.S. PATENT DOCUMENTS

| | | | | |
|---|---|---|---|---|
| 2,039,456 | A | * | 5/1936 | Sammarone ................ 310/166 |
| 4,687,960 | A | * | 8/1987 | Frister ......................... 310/42 |
| 5,300,845 | A | * | 4/1994 | Fanning et al. ............. 310/217 |
| 5,903,083 | A | * | 5/1999 | Mukai et al. ................ 310/263 |
| 6,084,320 | A | * | 7/2000 | Morita et al. ................ 310/12 |
| 6,225,714 | B1 | * | 5/2001 | Agnon et al. ................ 310/51 |
| 6,448,685 | B1 | * | 9/2002 | Mayer et al. ............... 310/254 |

FOREIGN PATENT DOCUMENTS

| | | | |
|---|---|---|---|
| JP | 56001756 | * | 1/1981 |
| JP | 5-236683 | * | 9/1993 |
| KR | 10-2002-77705 | | 10/2002 |

* cited by examiner

*Primary Examiner*—Burton Mullins
(74) *Attorney, Agent, or Firm*—McKenna Long & Aldridge LLP

(57) ABSTRACT

The present invention prevents peak noise caused by a resonance frequency, and reduces an overall noise of the system by binding core teeth of a stator of a BLDC motor with a vibration prevention member.

To do this, the present invention provides a brushless DC motor for a washing machine including a stator including a frame, a core in the frame, and a plurality of core teeth each extended outward from the frame and having a coil wound thereon, a rotor mounted to surround the core teeth, and rotatable when power is provided to the stator, and a vibration prevention member connected between the core teeth to bind the core teeth to each other, for prevention of vibration of the core teeth.

12 Claims, 8 Drawing Sheets

Prior Art

Prior Art

Prior Art

Prior Art

BLDC MOTOR FOR WASHING MACHINE

TECHNICAL FIELD

The present invention relates to washing machines, and more particularly, to a BLDC motor (Brushless Direct Current Motor) for driving a washing machine.

BACKGROUND ART

In general, the washing machine progresses washing, rinsing, and spinning cycles for removing dirt from laundry by using actions of detergent and water. In the washing machines, there are circulating type (pulsating type), agitating type (washing pole type), and drum type washing machines.

Each of above types of washing machines requires a motor for driving the washing machine, most of which is the BLDC motor. The BLDC motor, provided with a stator having a coil wound thereon and a rotor around the stator, for generating a rotating power when power is provided to the stator.

A related art BLDC motor will be described based on the drum type washing machine, briefly. FIG. 1 illustrates a section of a related art drum type washing machine, and FIG. 2 illustrates an enlarged view of 'A' part in FIG. 1.

Referring to FIGS. 1 and 2, there are a tub 3 inside of a cabinet for holding washing water, and a drum 9 inside of the tub 3 for introduction of laundry. There is a drum shaft 7 for transmission of a driving power from a BLDC motor 20 to the drum 9.

There are bearings 11 in front, and rear parts of the drum shaft 17, and a bearing housing 15 in a center part of a rear wall of the tub 3 for supporting the bearings 11. There are a supporting bracket 16 mounted on the tub 3 rear wall, and a stator 30 of the BLDC motor 20 mounted on the supporting bracket 16 with a plurality of bolts 19. There is the rotor 40 of the BLDC motor 20 mounted on a rear end part of the drum shaft 17 with a fastening bolt 18.

In the meantime, there are a door 1 in a front part of the cabinet 5, and a gasket 2 between the door 1 and the tub 3. There are hanging springs 4 between an inside of an upper part of the cabinet 5 and an upper part of an outside circumference of the tub 3, and a friction damper 10 between an inside bottom of the cabinet 5 and a lower part of the outside circumference of the tub 3, for attenuating vibration of the tub occurred during spinning.

FIG. 3 illustrates a perspective view showing the stator in FIG. 1 or 2 separately, and FIG. 4 illustrates a perspective view showing the rotor in FIG. 1 or 2, separately.

Referring to FIG. 3, the stator 30 is provided with an annular frame 31, and a plurality of core teeth 33 each extended outward from the frame 31 having a coil wound thereon.

There are fastening ribs 32 each formed as a unit with the frame 31 projected toward an inside of the frame 31 having a fastening hole 32a for mounting the stator 30 on a rear wall of the tub 3.

Referring to FIG. 4, the rotor 40 is provided with permanent magnets 41 attached to an inside, and mounted to the rear end part of the drum shaft 17 with the fastening bolt 18. According to this, the drum 9, connected to the rotor 40 directly, is rotated as the drum 9 receives the rotating power from the rotor 40 when the BLDC motor 20 is in operation.

In the drum type washing machine, the rotor 40 is rotated as a power is provided to the stator 30 to form an electric magnet which interacts with the permanent magnets 41 attached to the inside of the rotor 40, and the power transmitted to the drum shaft 17 through the rotor 40 rotates the drum 9, to carry out washing and spinning.

However, the related art drum type washing machine has a problem in that the fast alternation of polarities of the core teeth 33 in driving the BLDC motor 20 causes resonance at a certain rotation speed. Of course, the problem is occurred at other washing machines having the BLDC motor applied thereto.

FIG. 5 illustrates a graph showing a result of sound power level test (PWL test) of the related art BLDC motor for the washing machine.

That is, referring to FIG. 5, the washing machine having the related art BLDC motor 20 applied thereto shows peak noises in a range of 76 dB caused by resonance at 1360 RPM and 1550 RPM.

Moreover, the high overall noise, a mean value of the noises between the peak noises, in a range of 74 dB also drops a reliability of the product.

DISCLOSURE OF INVENTION

An object of the present invention for solving the foregoing related art problems lies on preventing peak noise caused by a resonance frequency, and reducing an overall noise of the system by binding core teeth of a stator of a BLDC motor with a vibration prevention member.

The object of the present invention can be achieved by providing a brushless DC motor for a washing machine including a stator including a frame, a core in the frame, and a plurality of core teeth each extended outward from the frame and having a coil wound thereon, a rotor mounted to surround the core teeth, and rotatable when power is provided to the stator, and a vibration prevention member connected between the core teeth to bind the core teeth to each other, for prevention of vibration of the core teeth.

The vibration prevention member binds outer ends of the core teeth. The vibration prevention member encloses each of outer ends of the core teeth at least once.

The vibration prevention member binds outer ends of the core teeth in succession. Preferably, the vibration prevention member includes one member for binding all the core teeth, continuously.

The vibration prevention member is a lacing thread for binding the core teeth. The lacing thread binds outer ends of the core teeth. The lacing thread winds each of outer ends of the core teeth at least once.

The lacing thread is formed of polyester, and binds the core teeth continuously, without disconnection. Of course, the vibration prevention member is a tape with a width for binding the core teeth.

The vibration prevention member is formed of a non-magnetic material. Accordingly, it is preferable that the vibration prevention member is formed of plastic, such as polyester.

BRIEF DESCRIPTION OF DRAWINGS

The accompanying drawings, which are included to provide a further understanding of the invention, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings.

Figure 1:
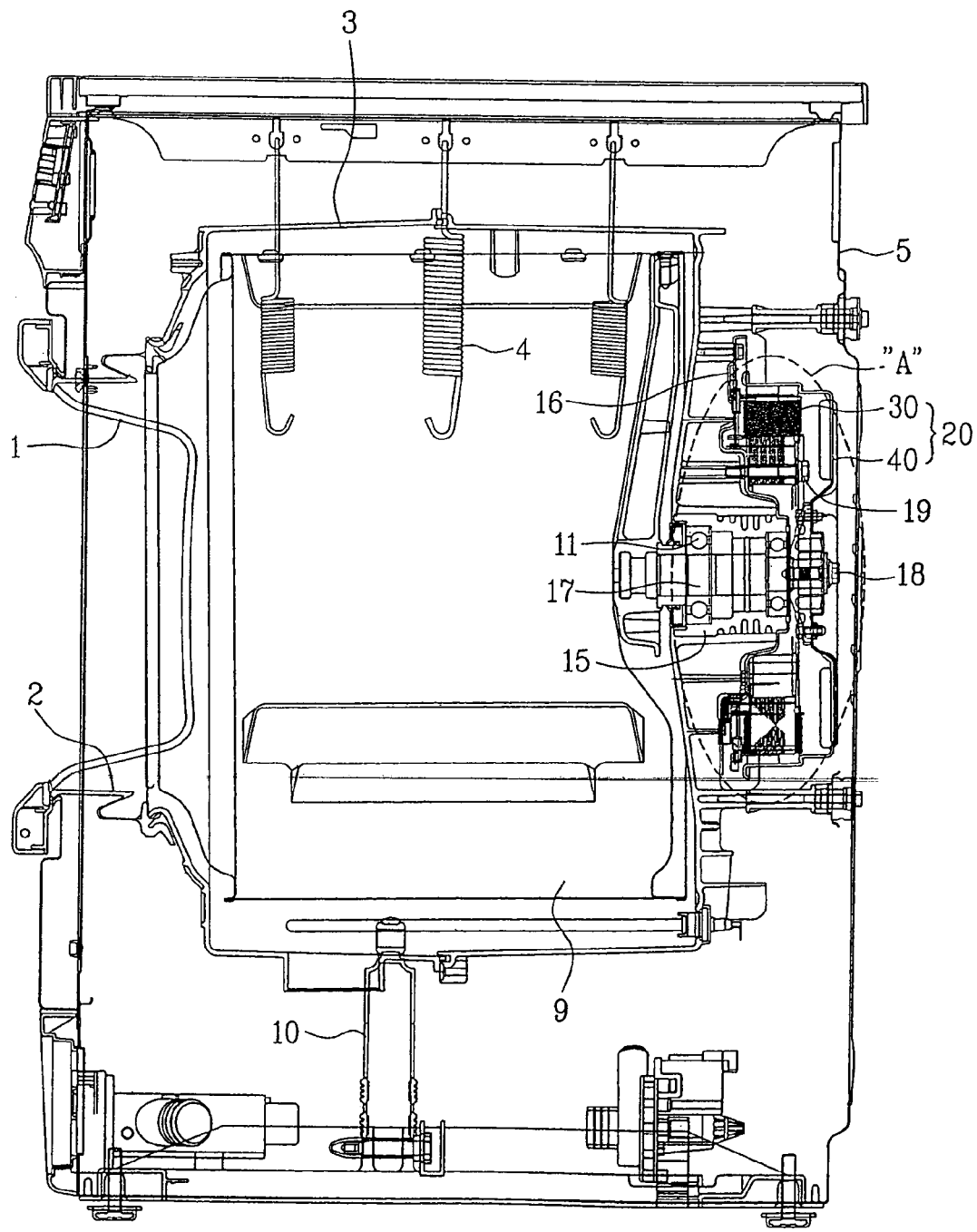
FIG. 1 illustrates a section of a related art drum type washing machine.
Figure 2:
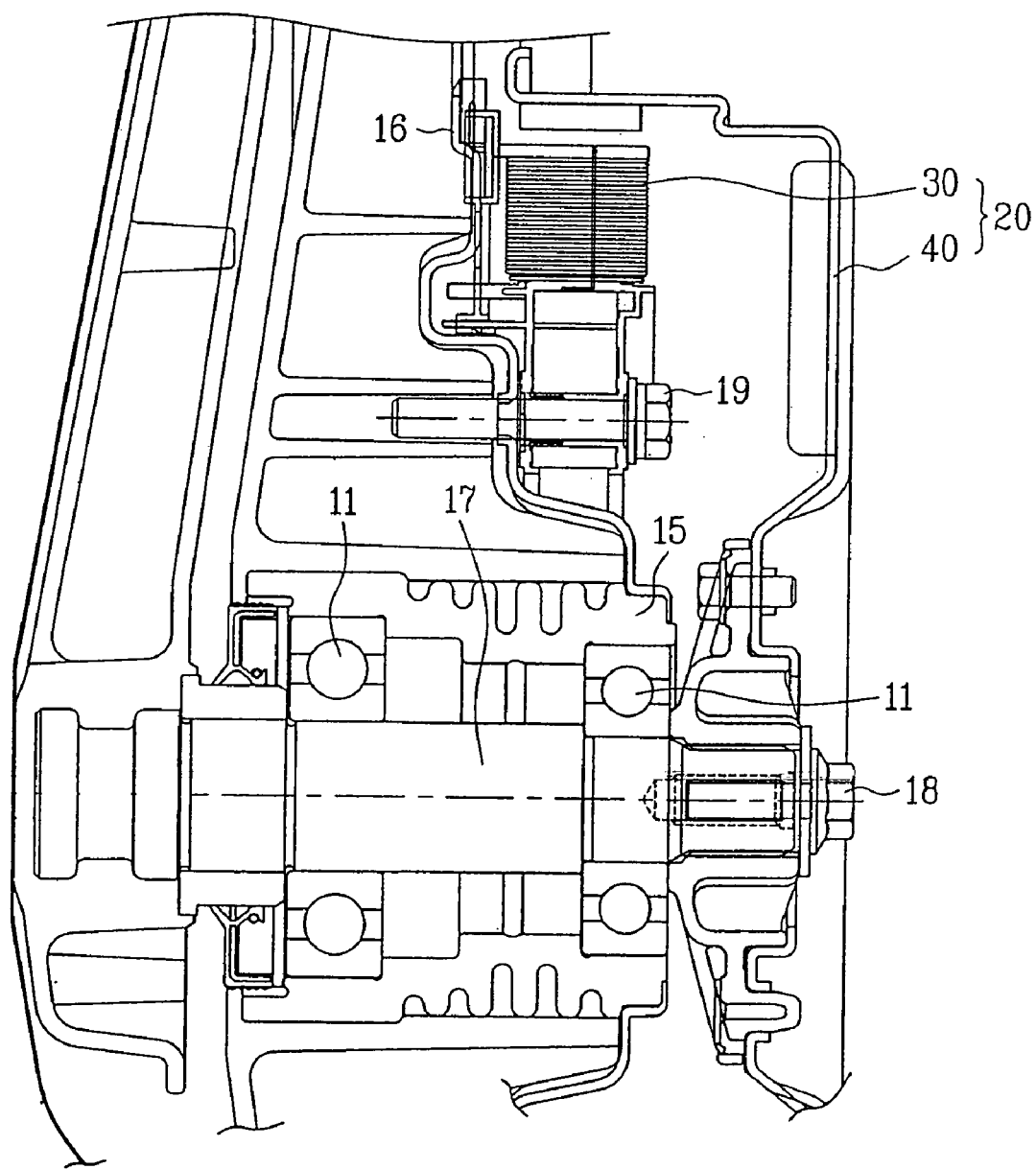
FIG. 2 illustrates an enlarged view of 'A' part in FIG. 1.
Figure 3:
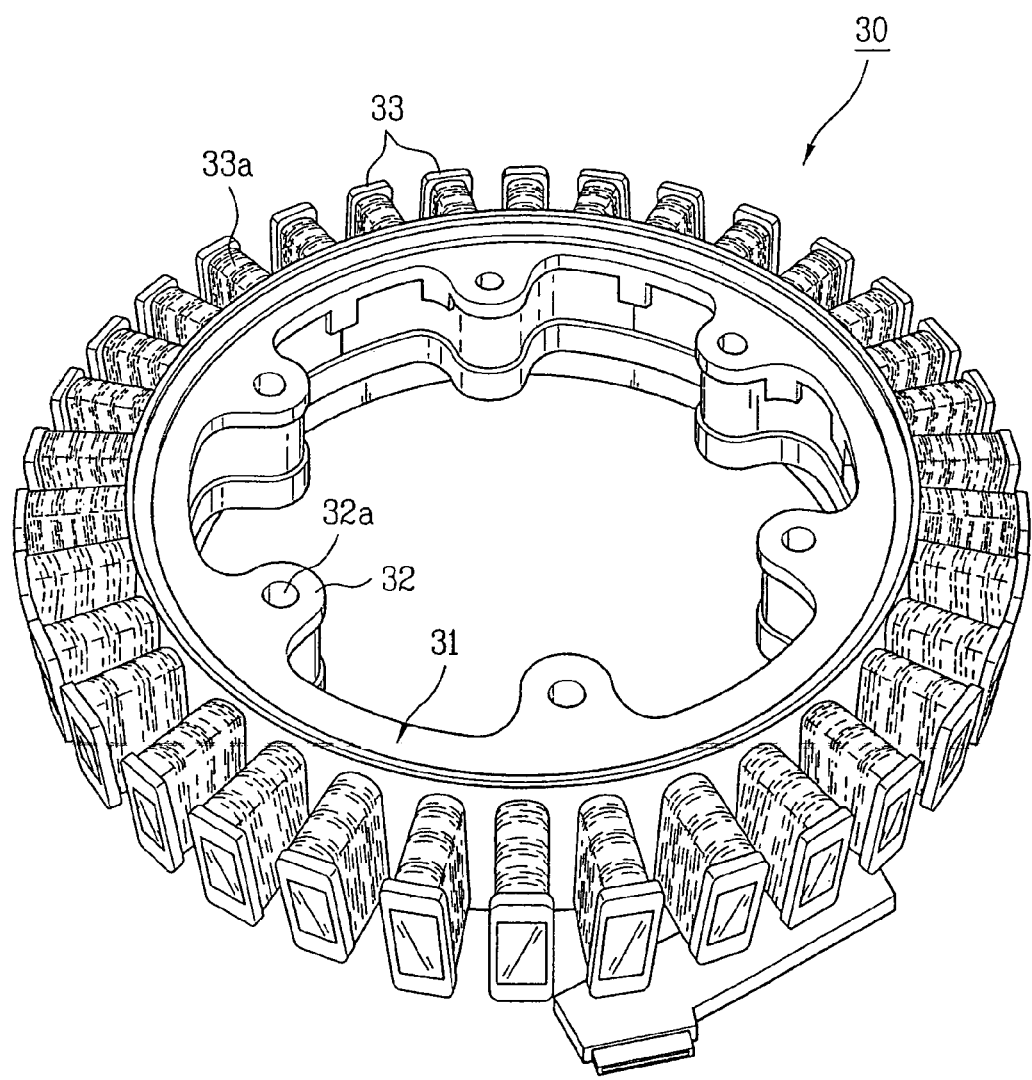
FIG. 3 illustrates a perspective view showing the stator in FIG. 1 or 2 separately.
Figure 4:
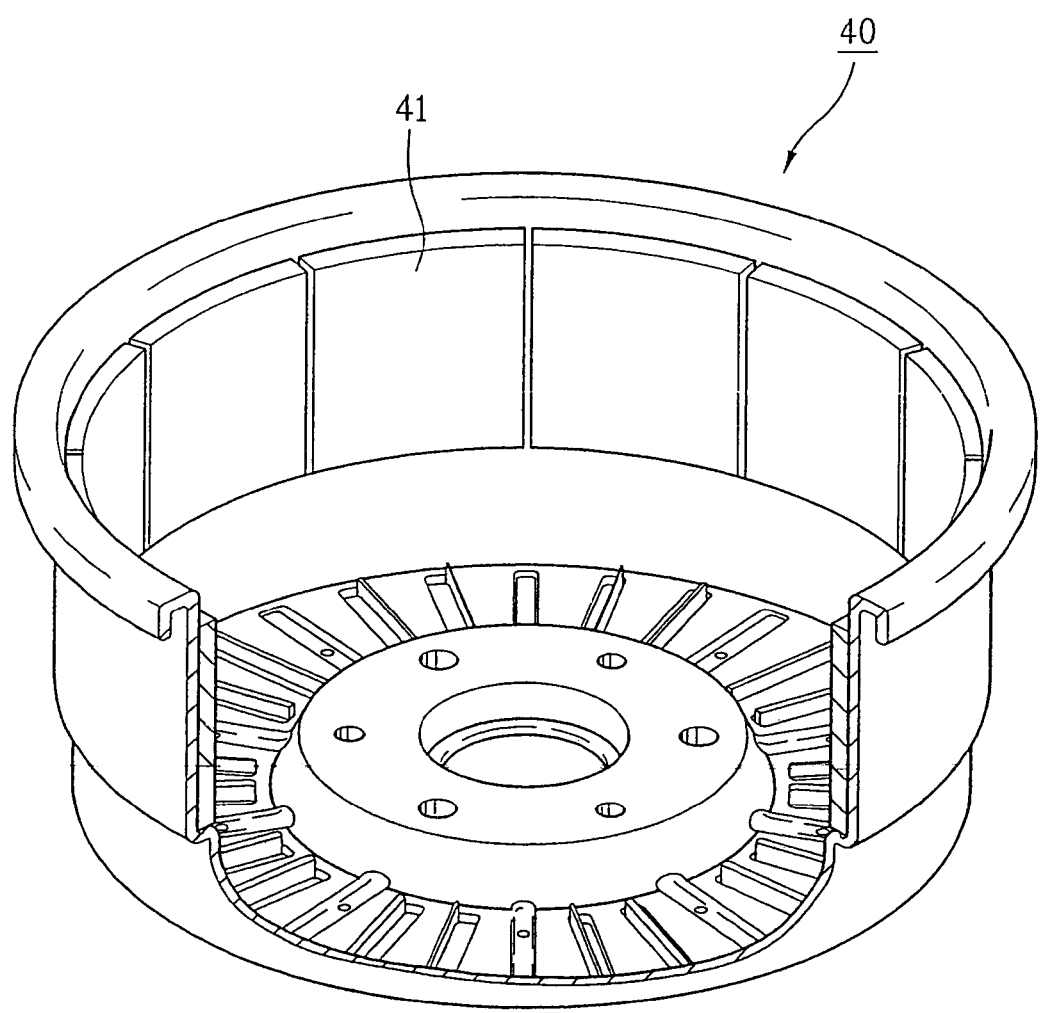
FIG. 4 illustrates a perspective view showing the rotor in FIG. 1 or 2, separately.
Figure 5:
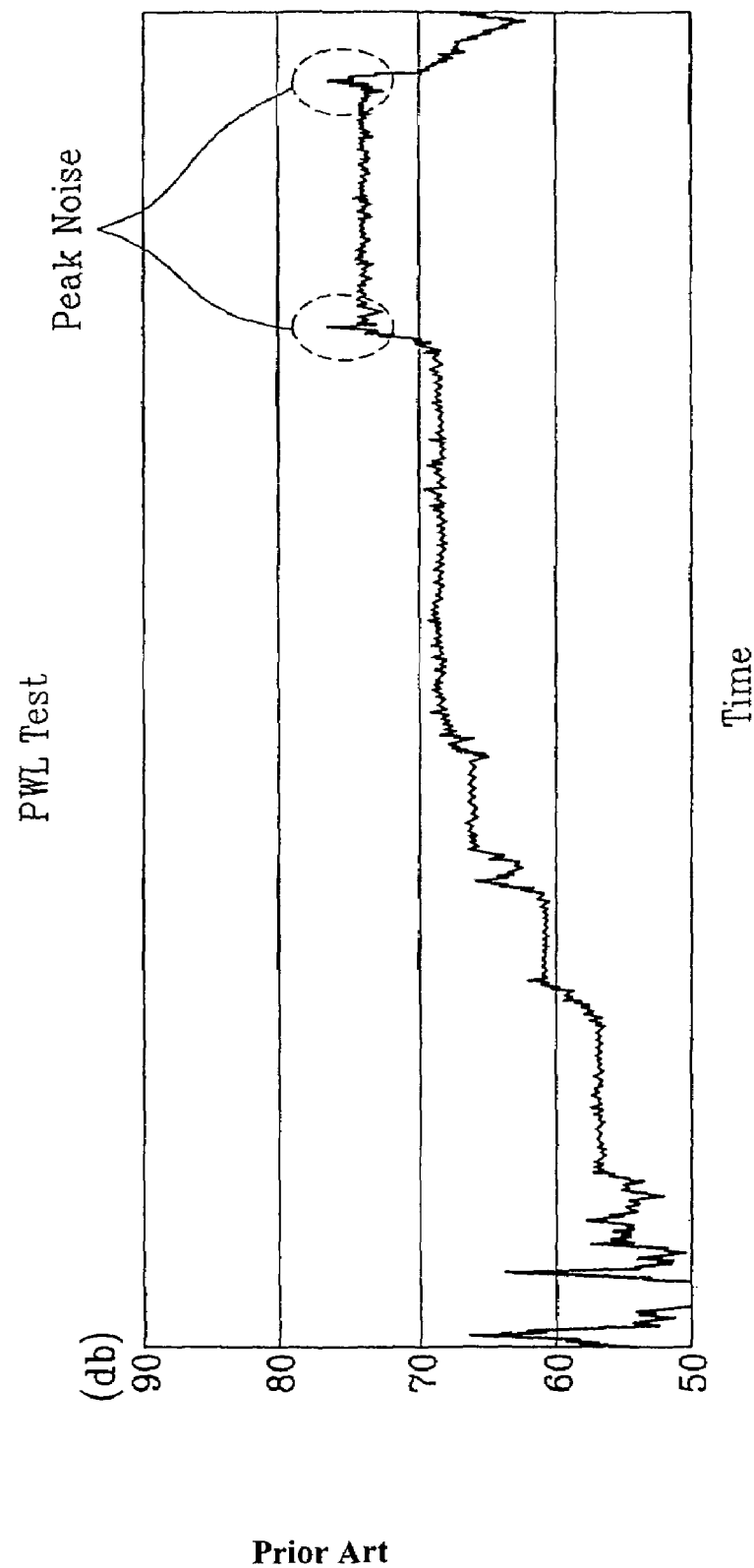
FIG. 5 illustrates a graph showing a result of sound power level test (PWL test) of a related art BLDC motor for the washing machine.
Figure 6:
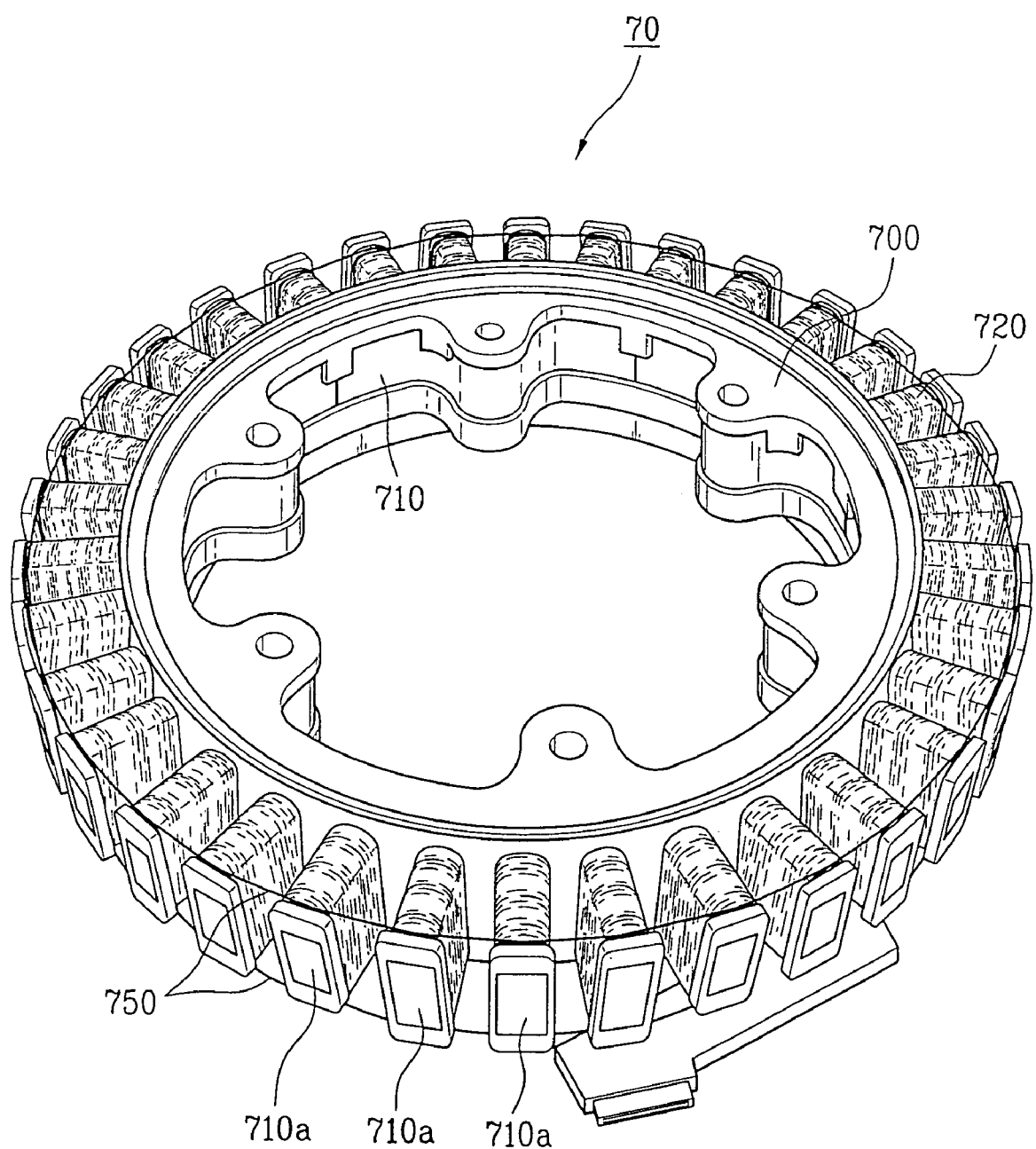
FIG. 6 illustrates a perspective view showing a stator in accordance with a preferred embodiment of the present invention.
Figure 7:
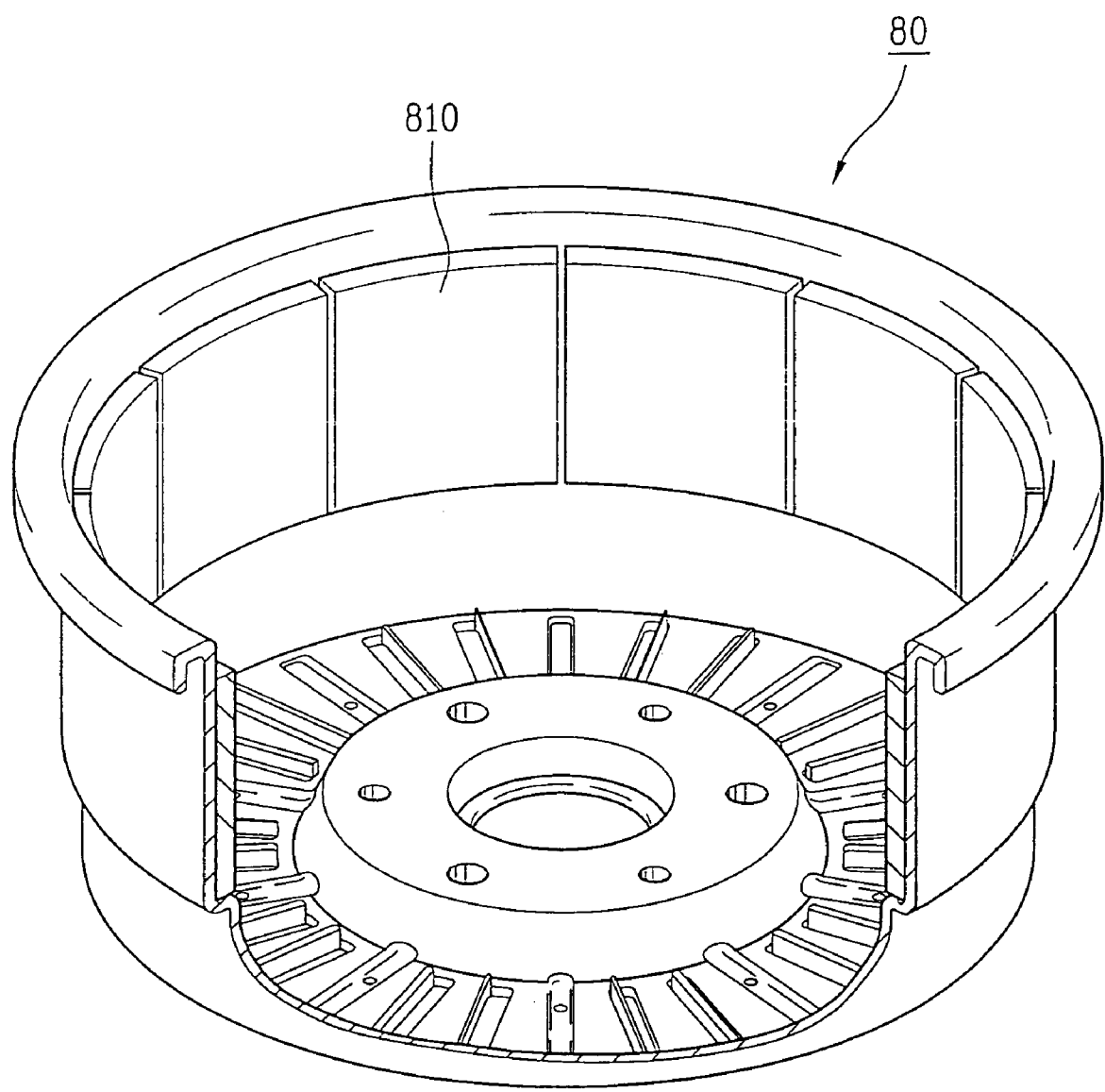
FIG. 7 illustrates a perspective view showing a rotor in accordance with a preferred embodiment of the present invention.

FIG. 6 illustrates a perspective view showing a stator in accordance with a preferred embodiment of the present invention, and FIG. 7 illustrates a perspective view showing a rotor in accordance with a preferred embodiment of the present invention.

Referring to FIGS. 6 and 7, the BLDC motor for a washing machine includes a stator 70, and a rotor 80 around the stator 70.

The stator 70 includes a frame 700, a core 710 in the frame 700, and a plurality of core teeth 710a each extended outward from the frame 700 and having a coil wound thereon.

The rotor 80 includes a plurality of permanent magnets 810 surrounding the core teeth 710a, and is mounted so as to be rotatable when power is provided to the stator 70.

Moreover, the BLDC motor further includes a vibration prevention member 750 for suppressing vibration of the core teeth 710a. The vibration prevention member 750 binds the core teeth 710a to each other, for prevention of vibration of the core teeth 710a when the BLDC motor is driven.

To do this, the vibration prevention member 750 binds outer ends of the core teeth 710a. That is, a part in the core tooth 710 where the vibration is the most intense when the BLDC motor is driven is the outer end of the core tooth 710. Therefore, once the outer ends of the core teeth 710a are bound with the vibration prevention member 750, the vibration of the core teeth 710a can be attenuated. Of course, center parts of the core teeth 710a can be bound with the vibration prevention member 750.

Moreover, it is preferable that the supporting member 750 encloses the core tooth 710 at least once for firmer supporting of the core teeth 710a.

Furthermore, the vibration prevention member 750 binds the core teeth 710a in succession. That is, the vibration prevention member 750 binds adjacent core teeth 710a in succession with reference to one core tooth 710a. Of course, the vibration prevention member 750 may bind the other core teeth 710a.

In the meantime, it is preferable that the vibration prevention member 750 is a unitary member that binds all the core teeth 710a, continuously. The vibration prevention member 750 may be a plurality of members each for binding a few core teeth 710a into one unit. In this instance, it is preferable that the units of core teeth 710a are in turn connected with a separate vibration prevention member 750.

It is preferable that the vibration prevention member 750 is formed of a non-magnetic material, otherwise the vibration prevention member 750 can be magnetized, and impede operation of the motor. Therefore, it is preferable that the vibration prevention member 750 is formed of a plastic, such as polyester.

The vibration prevention member 750 will be described in more detail. The vibration prevention member 750 is a lacing thread for binding the core teeth 710a.

The lacing thread binds outer ends of the core teeth 710a. The lacing thread is wound around each of the outer ends of the core teeth 710a at least once, and, particularly, it is preferable that the lacing thread binds the core teeth 710a continuously, without disconnection.

It is preferable that the lacing thread is formed of a non-magnetic material, such as polyester.

Of course, other than the lacing thread, there can be a variety of embodiments of the vibration prevention member 750, such as a tape with a certain width for binding the core teeth 710a.

The operation of the BLDC motor for a washing machine of the present invention will be described.

When the BLDC motor is in operation, a polarity of each of core teeth 710a of the stator 70 alternate at a fast speed, to cause vibration of each of the core teeth 710a.

However, vibration of the core teeth 710a of the stator 70 in the BLDC motor of the present invention, bound to each other with the vibration prevention member 750, is suppressed. According to this, vibration of the stator 70 is also reduced, to permit to avoid peak noise caused by a system resonance.

That is, the BLDC motor of the present invention can suppress the vibration by means of the vibration prevention member 750 that binds, and connects the core teeth 710a of the stator 70 to each other.

Figure 8:
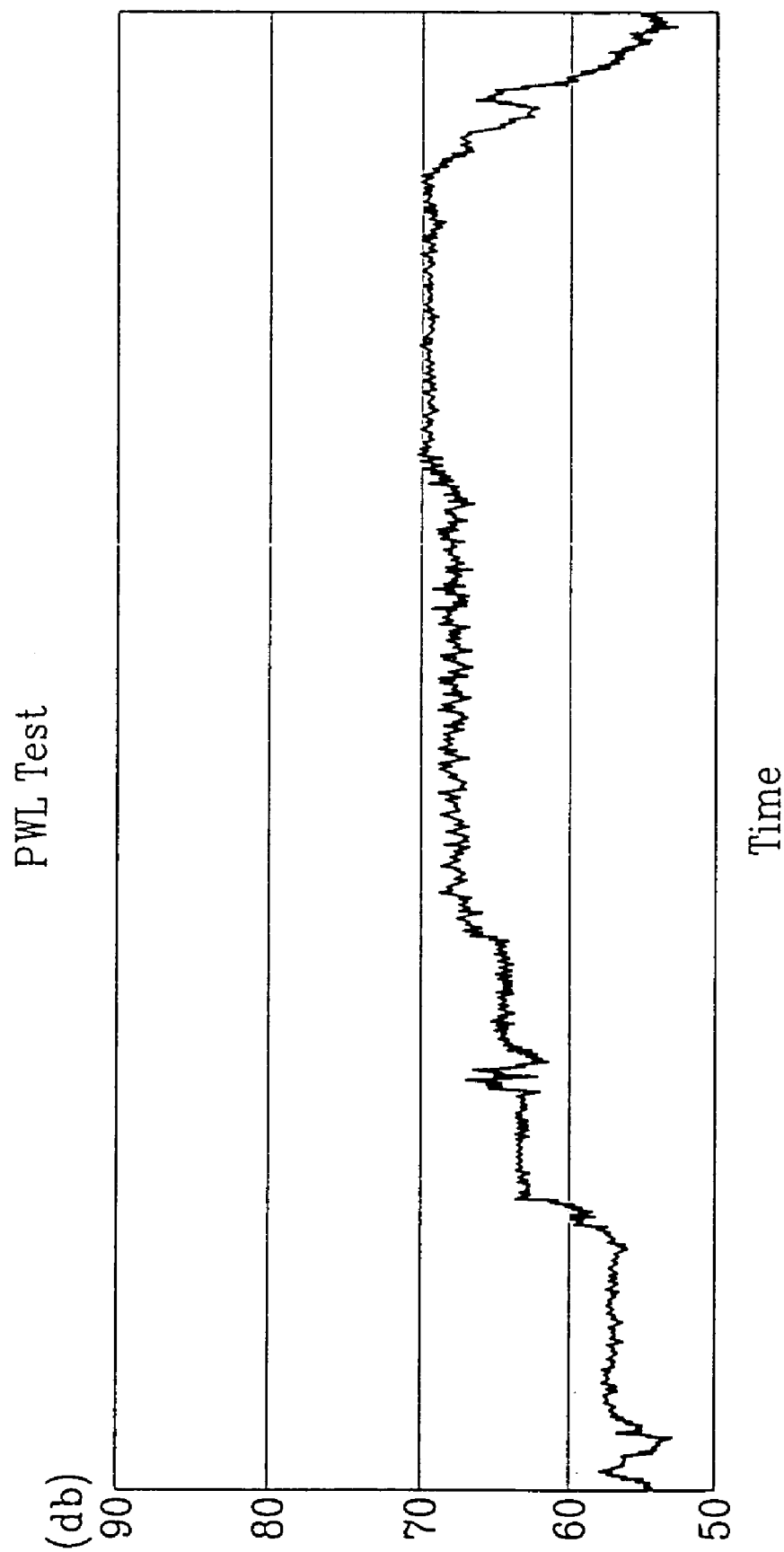
FIG. 8 illustrates a graph showing a result of sound power level test (PWL test) of a BLDC motor in accordance with a preferred embodiment of the present invention.

FIG. 8 illustrates a graph showing a result of sound power level test (PWL test) of a BLDC motor in accordance with a preferred embodiment of the present invention.

Referring to FIG. 8, it can be noted that the noise is dropped to a 70 dB level from 76 dB in the related art as a result of application of the BLDC motor of the present invention. Moreover, it can be noted that the system overall noise is also reduced when the BLDC motor of the present invention is applied.

That is, the related art BLDC motor shows the overall noise value in a range of 74 dB as the core teeth 710a of the stator 70 vibrate. However, it can be noted that, as the core teeth 710a of the stator 70 of the present invention are bound with the supporting member 750, to suppress the vibration, the overall noise value is in a range of 69 dB level.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The vibration prevention member 750 on the stator 70 prevents vibration of the core teeth 710a caused by alternation of polarities in driving the motor.

Moreover, the peak noise coming from the system resonance caused by vibration of the core teeth 710a is suppressed, and the overall noise is also reduced. At the end, the BLDC motor reduces an overall noise of the washing machine, and enhances product reliability.

What is claimed is:

1. A brushless DC motor for a washing machine comprising:
    a stator including a frame, a core in the frame, and a plurality of core teeth each extended outward from the frame and having a coil wound thereon;
    a rotor mounted to surround the core teeth, and rotatable when power is provided to the stator; and
    a vibration prevention lacing thread connected between the core teeth, to bind the core teeth to each other, to prevent the vibration of the core teeth.

2. The brushless DC motor as claimed in claim 1, wherein the vibration prevention lacing thread binds outer ends of the core teeth.

3. The brushless DC motor as claimed in claim 1, wherein the vibration prevention lacing thread encloses each of outer ends of the core teeth at least once.

4. The brushless DC motor as claimed in claim 1, wherein the vibration prevention lacing thread binds outer ends of the core teeth in succession.

5. The brushless DC motor as claimed in claim 1, wherein the vibration prevention lacing thread includes one member for binding all the core teeth continuously.

6. The brushless DC motor as claimed in claim 1, wherein the lacing thread binds outer ends of the core teeth.

7. The brushless DC motor as claimed in claim 1, wherein the lacing thread winds each of outer ends of the core teeth at least once.

8. The brushless DC motor as claimed in claim 1, wherein the lacing thread binds the core teeth continuously, without disconnection.

9. The brushless DC motor as claimed in claim 1, wherein the lacing thread is formed of polyester.

10. The brushless DC motor as claimed in claim 1, wherein the vibration prevention lacing thread is formed of a non-magnetic material.

11. The brushless DC motor as claimed in claim 10, wherein the vibration prevention lacing thread is formed of plastic.

12. The brushless DC motor as claimed in claim 11, wherein the vibration prevention lacing thread is formed of polyester.

* * * * *